United States Patent [19]
Clark

[11] Patent Number: 5,629,802
[45] Date of Patent: May 13, 1997

[54] SPATIALLY MULTIPLEXED OPTICAL SIGNAL PROCESSOR

[75] Inventor: Natalie Clark, Albuquerque, N.M.

[73] Assignee: The United States of America as represented by the Secretary of the Air Force, Washington, D.C.

[21] Appl. No.: 369,037

[22] Filed: Jan. 5, 1995

[51] Int. Cl.$^6$ .................. G02B 5/18; G03H 1/16
[52] U.S. Cl. .................. 359/573; 359/559; 359/566
[58] Field of Search .................. 359/29, 559, 560, 359/561, 15, 358, 573, 566; 382/181, 279, 278, 280

[56] References Cited

U.S. PATENT DOCUMENTS

| | | | |
|---|---|---|---|
| 4,695,973 | 9/1987 | Yu | 359/561 |
| 4,991,975 | 2/1991 | Alferness et al. | 370/4 |
| 5,028,102 | 7/1991 | Ogura et al. | 359/29 |
| 5,039,210 | 8/1991 | Welstead et al. | 359/36 |
| 5,121,228 | 6/1992 | Paek | 359/561 |
| 5,132,811 | 7/1992 | Iwaki et al. | 359/6 |
| 5,150,228 | 9/1992 | Liu et al. | 359/7 |
| 5,195,103 | 3/1993 | Hinton et al. | 372/96 |
| 5,253,161 | 10/1993 | Nemirovsky et al. | 364/402 |
| 5,282,067 | 1/1994 | Liu | 359/4 |
| 5,295,138 | 3/1994 | Greenberg et al. | 370/57 |
| 5,363,221 | 11/1994 | Sutton et al. | 359/11 |
| 5,426,521 | 6/1995 | Chen et al. | 359/559 |

OTHER PUBLICATIONS

Leger et al, "Coherent beam addition of GaAlAs lasers by binary phase gratings". Feb. 1986.

Jahns et al, "Damman gratings for laser beam shaping", vol. 28 No. 12. Dec. 1989.

Primary Examiner—Timothy P. Callahan
Assistant Examiner—My-Trang Nu Ton
Attorney, Agent, or Firm—Robert L. Nathans; Stanton E. Collier

[57] ABSTRACT

A spatial light modulator has a plurality of pairs of input and reference images recorded upon a plurality of sub-areas thereof. Each sub-area is illuminated with an associated point source of light which is produced by illuminating a diffraction grating with coherent light. A Fourier transform lens produces a joint transform of each pair of input and reference images which can be detected by a CCD camera.

2 Claims, 1 Drawing Sheet

SPATIALLY MULTIPLEXED OPTICAL SIGNAL PROCESSOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of electro-optical signal processors. The inherent parallelism associated with optical signal processing techniques allows such systems to process a large image just as rapidly as a small one; whereas, for digital methods, the processing time tends to increase exponentially with image size. For example, a single liquid crystal television can be driven at 60 frames per second. Thus, 60 2D Fourier transforms (Fraunhofer diffraction patterns) could be formed per second. This is much faster than current state-of-the-art digital techniques. Moreover, other spatial light modulators such as ferro-electric devices, which are more expensive, can be driven at even faster rates of 2,000 frames per second.

Current optical signal processors, using spatial light modulators as programmable transparencies, process a single image at a time. Since very high resolution spatial light modulators are commercially available, often the images to be processed do not require the full TV screen. Hence the "single image" optical systems discussed above don't take full advantage of the inherent parallelism associated with optical processing signal processing. It is thus desirable to partition the TV screen or other SLM into separate regions so that several Fourier transforms can be optically computed in parallel to significantly increase the throughput rates for many optical signal processing applications.

Using lenslet arrays has been suggested for spatial multiplexing. However, using lenslet arrays suffer from serious disadvantages. Most importantly, for high resolution spatial light modulators, small diameter lenses must be used. Such small lenslets tend to be poor in quality and consequently have aberrations that significantly degrade the diffraction pattern. Moreover, even if perfect small lenslets could be manufactured, their small diameter, relative to the partitioned region to be optically processed, also causes serious degradation in the resulting diffraction patterns. In order to avoid this problem, the lenslet diameter would need to be several times larger than the partitioned region; but this severely limits the number of regions that can be partitioned and thus reduces the number of Fourier Transforms that can be computed in parallel. Secondly, each of the lenslets must be aligned and spaced very accurately to within a few microns. No such lenslet arrays exist and consequently, haven't been used to perform spatial multiplexing. Thirdly, lenslet arrays are very expensive. The present invention does not suffer from any of these drawbacks.

SUMMARY OF A PREFERRED EMBODIMENT OF THE INVENTION

In accordance with the invention, a two-dimensional diffraction grating is illuminated by a laser and a focussing lens converts the interference pattern produced by the grating into a phased array of point sources, each illuminating an associated sub-region on an image display device such as a spatial light modulator (SLM) or a liquid crystal TV (LCTV).

The processor of the present invention can be used to measure the degree of correlation of several pairs of input and reference images simultaneously in a single SLM which offers advantages in speed, cost, size and power consumption relative to existing digital methods.

DETAILED DESCRIPTION OF AN EMBODIMENT OF THE INVENTION

Figure 1:
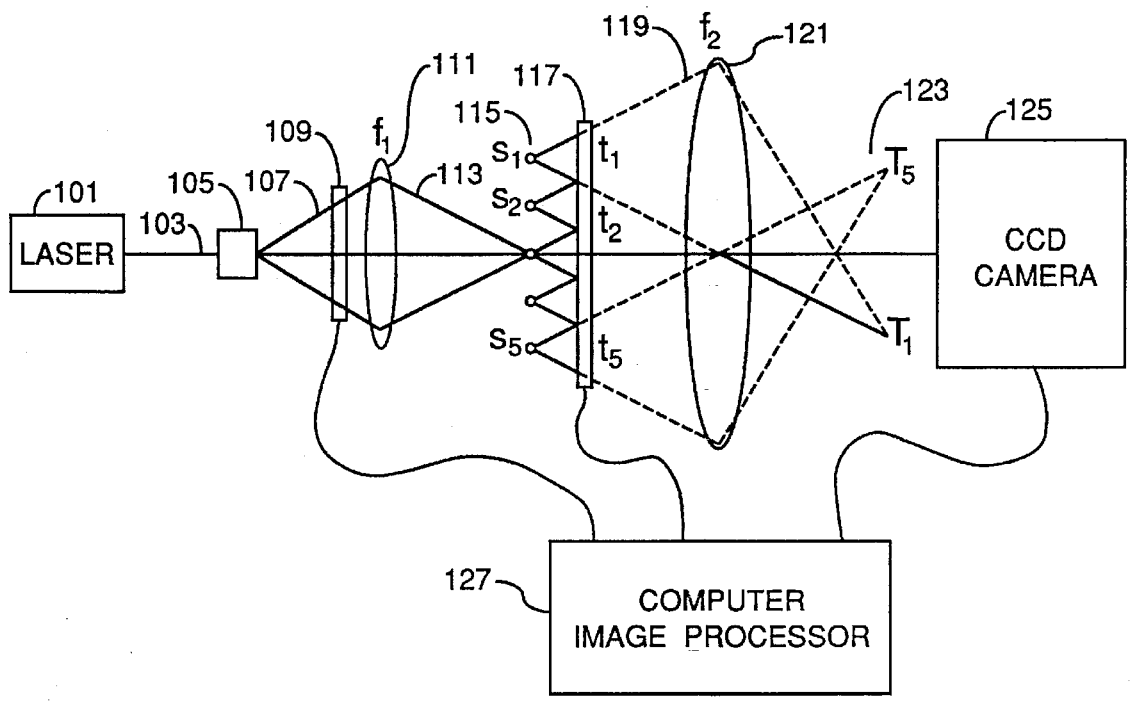
FIG. 1 discloses the spatially multiplex optical signal processor being employed as a joint transform correlator.

In FIG. 1, a laser 101 is used as a coherent illumination source. The laser beam 103 is expanded by a beam expander 105, and the resulting expanded beam 107 is used to illuminate a two-dimensional diffraction grating or cross grating 109. The diffraction grating 109 is used to generate, for example, a five by five rectangular two-dimensional array of twenty-five point sources 115 (five such point sources $s_1, s_2 \ldots s_5$ are shown in FIG. 1). This diffraction grating is a conventional grating, in an optical sense, as defined in Jenkins and White's well known text, "Fundamentals of Optics", McGraw Hill, Inc., New York, 1950, on page 320. Such a grating has parallel, equidistant slits of the same width, as is well understood by skilled workers in the art. The interference pattern produced by the grating is directed at focussing lens 111 which focusses the bright regions of the interference pattern via path 113 to form the phased array point sources 115. The diffraction grating 109 can be implemented in several ways. If the spacing of the point sources never changes, then a fixed grating such as a Ronchi ruling, or Damann grating can be conveniently used. However, if a variable diffraction grating is desired, a spatial light modulator could be used as a real-time programmable diffraction grating controlled by processor 127. For example, a rectangular grating g(x,y) can be mathematically expressed as $$g(x,y) = a(x,y) \left[ \text{rect}\left(\frac{x}{b_x}, \frac{y}{b_y}\right) ** \frac{1}{g_x g_y} \text{comb}\left(\frac{x}{g_x}, \frac{y}{g_y}\right) \right]$$

where a(x,y) is the effective aperture of the grating; $b_x$ and $b_y$ are the dimensions of the sampling element and $g_x$ and $g_y$ are the sampling interval of the grating in the x and y directions, respectively. Each of the bright spots generated by the diffraction grating expressed by equation (1) consists of a narrow $$A\left(\frac{x}{\lambda Z_g}, \frac{y}{\lambda Z_g}\right)$$

function (due to the relatively large aperture function a(x, y)). The bright spots are separated from each other by $$\frac{\lambda Z_g}{b_x} \text{ and } \frac{\lambda Z_g}{b_y}$$

in the x and y directions respectively, where $Z_g$ is the distance from the exit pupil (the grating g(x,y) is the aperture stop) to the plane containing the array of point sources and $A(\xi,\eta)$ is the Fourier Transform of the aperture function a(x,y).

Using either the fixed or variable diffraction grating has several advantages over using a lenslet array or using an array of laser diodes as point sources. As discussed in the background section, the diameter of each lenslet cannot be neglected if it is approximately the same size as the multiplexed sub-regions. Using lenslets wherein the diameter is about the same size as the multiplexed sub-regions severely degrades the correlator systems performance. In addition, alignment tolerances required in an optical correlation system tend to preclude lenslets from being used. Using either the fixed or variable diffraction grating also has several advantages over using an array of laser diodes as point sources. First, the spacing of the point sources using a diffraction grating is more accurate. Second, a diffraction grating is inexpensive. Third, the diffraction gratings can be custom designed to control the intensity of each individual point source. Fourth, and perhaps most importantly, the point sources produced by a diffraction grating only radiate in a fixed solid angle dictated by the size of the aperture on the diffraction grating 109. Consequently, the point sources produced by the diffraction grating will only illuminate an associated sub-region or sub-area of the spatial light modulator 117 ( t1, t2 ... t5 shown in FIG. 1). If an array of laser diodes were used, each diode would radiate equally in all directions and specially designed lenses would have to be designed to overcome this.

The optional use of a programmable diffraction grating at 109 enables the flexibility to change the point source spacing, intensity, and angle of illuminatating in real-time thus allowing it to be used for a wider variety of applications. A particularly novel method for using a liquid crystal TV as a programmable point source generator was used in the protype joint transform correlator system to track blood flow and tissue motion in ultrasound images. This allows the LCTV to become a sinusoidal grating coupled with a variable aperture, whereby the grating may be dynamically programmed to adjust both the point source spacing and individual point source intensities in real time if desired. For further details regarding a suitable prior art dynamic programming technique for an SLM, see "Dynamic Holographic Interconnects that use Ferro-electric Liquid-crystal Spatial Light Modulators", Applied Optics, vol. 33, No. 14, May 1994; D.C. O'Brien et al. In addition, this technique allows the aperture of the gratings to be varied. The grating aperture is that portion of the grating that is transmitting light. Varying the aperture size in turn controls the subregions or sub-areas each point source illuminates on SLM 117.

Lens 121 is the Fourier transform lens. It produces an array of images, ($T_1, T_2, \ldots T_5$ in FIG. 1) that correspond to 2-dimensional Fourier Transforms 123 of each individual sub-region on the spatial light modulator 117; $t_1, t_2, \ldots t_5$ in FIG. 1.

Figure 2:
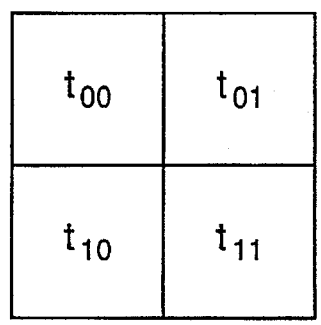
FIGS. 2 and 3 illustrate aspects of an exemplary use of the invention.
Figure 3:
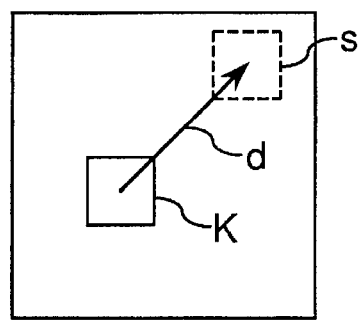

The spatially muliplexed optical signal processor shown in FIG. 1 was incorporated into a joint transform correlator (JTC) system. A conventional JTC system is well known to those skilled in the art and is fully described in U.S. Pat. No. 5,119,443, entitled SINGLE SLM JOINT TRANSFORM CORRELATOR, and incorporated by reference herein. The irradiance pattern (magnitude squared) of the aforesaid Fourier transforms are recorded by the CCD camera 125. They can be recorded for future use or can, if desired, be promptly digitized by processor 127 and sent to the SLM 117 for a second pass through the system, and the inverse Fourier transforms of the fresh signals now in the SLM may be recorded by the CCD camera to determine the degree of correlation between the input and reference images of each image pair being displayed in each of the aforesaid sub-areas of the SLM 117 which thus may be termed an image display means. This process is described in the aforesaid patent. The JTC constructed in accordance with the invention, used an Epson LCTV for the SLM 117 and a 1000 line/inch two-dimensional cross grating was generated therein. Focussing lens 111 was arbitrarily chosen having an approximate 100 mm focal length and was positioned to intercept the interference pattern produced by the grating and to produce the rectangular array of point sources, separated by 5 mm from each other. The aperture on the grating was then adjusted to ensure that the resulting illuminated areas didn't overlap. The irradiance or light intensity illuminating each sub-area of the LCTV was equalized by using small pieces of film to appropriately attenuate the individual illuminated regions. The array of point sources were imaged by the second Fourier transform lens 121 upon the CCD camera. A 2×2 image spatially multiplexed JTC prototype was built. The JTC system was used experimentally to track blood flow and tissue motion in ultrasound speckle images. The size of the subregions of the input LCTV depends upon the size of the kernel and search regions k and s respectively, shown in FIG. 3, required for accurate tracking. The kernel regions were rectangular with dimensions $w_k^x=15$ and $w_k^y=17$ pixels. The size of the kernels used were the same as that used by Duke University to measure the axial tracking accuracy of their digital system. The larger search region was also rectangular with dimensions $w_s^x=17$ and $w_s^y=22$ pixels. To illustrate the spatial multiplexing technique, four subregions, denoted $t_{00}, t_{01}, t_{10}, t_{11}$, are illustrated in FIG. 2. The separation between the kernel and search region, denoted by d in FIG. 3, should be sufficient to ensure that the desired cross-correlations are formed.

The region surrounding the kernel and search regions, can be chosen to add a little dead space between subregions to avoid aliasing between the illumination sources.

A LCTV was used as a programmable sinusoid diffraction grating to generate equally bright point sources. The aperture on the sinusoidal grating was programmed to ensure only 64×64 pixel (approximately 5×5 mm) regions on the spatial light modulator 117 (which was also a LCTV). The kernel and search regions were separated by 32 pixels.

The choice of the second lens 121, having a focal length $f_2$, is more critical than the choice of lens 111 having a focal length of $f_1$. The array of point sources 115 were imaged by the second lens 121 onto the CCD camera 125. The active area of the CCD camera used in the spatially multiplexed system was approximately 1×1 cm which corresponded to size of the four point sources used to illuminate the Epson LCTV. The point sources were placed a distance $2f_2$ in front of the second lens ($Z_{35}=2f_2$). Moreover, the resulting Fraunhofer diffraction pattern form each subregion of the input LCTV must be large enough for the CCD camera to resolve the fringe pattern. In addition, if methods to remove the repeated orders are not used, the scale $Z_{45}$ must be chosen to ensure the first order terms do not interfere with any of the zero order diffraction patterns. Consequently, $Z_{45} < f_2$. A 100 mm focal length lens was used to do this. The LCTV was positioned against the lens. The scale $Z_{45}$ was chosen to produce first order terms which were space ¾ the distance between the image of the point sources formed at $Z_5$.

Thus it should now be appreciated that this invention allows the inherent parallelism associated with optical signal processing systems to be optimized. The increased throughput is accomplished by using a diffraction grating to generate a phased array of point sources which in turn are used to illuminate individual regions of an image display device. The remaining components of this invention ensure accurate and appropriately scaled diffraction patterns are formed.

Since this invention can be used to optically compute tens of thousands of 2D Fourier transforms per second it can be used in a wide variety of real-time pattern recognition and tracking applications with an accuracy comparable to digital methods (which are much slower). In addition, this invention offers advantages in cost, size, and power consumption over other techniques.

Since other embodiments of the invention will occur to the skilled worker in the art, the scope of the invention is to be measured by the terms in the claims and art recognized equivalents thereof.

What is claimed is:

1. An optical image processor comprising:

(a) a spatial light modulator;

(b) image display means having signals therein within a plurality of subareas thereof;

(c) a variable programmable diffraction grating within said spatial light modulator, said variable programmable diffraction grating having apertures that can be varied, and having parallel, equidistant slits of the same width;

(d) means for illuminating said variable programmable diffraction grating to produce diffracted light;

(e) focusing lens means, positioned between said variable programmable diffraction grating and said spatial light modulator, for producing a phased array of point sources of light from the diffracted light produced by said variable programmable diffraction grating, each point source of light being positioned adjacent an associated subarea of said image display means;

(f) an image recording device; and (g) a Fourier transform lens coupled between said image display means and said image recording device for directing Fourier transforms of images within each subarea of said image display means upon said recording device.

2. The combination as set forth in claim 1 wherein said diffraction grating is a two-dimensional cross grating.

* * * * *